No. 886,283. PATENTED APR. 28, 1908.
W. L. WAYRYNEN.
CARBURETER.
APPLICATION FILED JUNE 15, 1907.
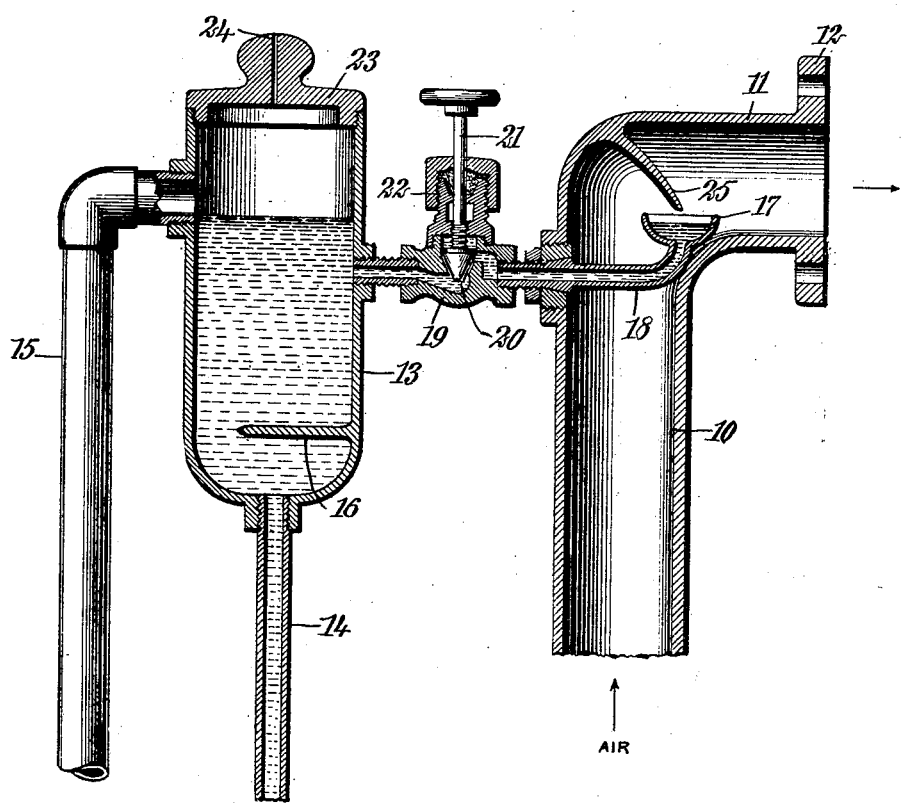
INVENTOR
William L. Wayrynen

UNITED STATES PATENT OFFICE.

WILLIAM L. WAYRYNEN, OF DOLPH, SOUTH DAKOTA.

CARBURETER.

No. 886,283.  Specification of Letters Patent.  Patented April 28, 1908.

Application filed June 15, 1907. Serial No. 379,159.

*To all whom it may concern:*

Be it known that I, WILLIAM L. WAYRYNEN, a citizen of the United States, and a resident of Dolph, in the county of Hamlin and State of South Dakota, have invented a new and Improved Carbureter, of which the following is a full, clear, and exact description.

This invention relates to certain improvements in carbureters for forming the explosive charge for internal combustion engines, and relates more particularly to means whereby a mixture of uniform composition may be formed irrespective of the quantity of gasolene or other fuel in the supply tank, and irrespective of the speed of the engine. In my improved carbureter the presence of impurities in the liquid fuel does not interfere with the operation of the device, as no needle valve or fine passage is employed.

The invention consists in certain features of construction and combinations of parts, all of which will be fully set forth hereinafter and particularly pointed out in the claims.

Reference is to be had to the accompanying drawing, forming a part of this specification, in which the figure shows a section through a carbureter constructed in accordance with my invention.

In the specific form of the carbureter illustrated in the accompanying drawings, I provide an air supply conduit 10, preferably extending in a vertical direction and having an elbow by which it unites with a horizontally-disposed portion 11 provided with a flange 12 by which the conduit may be rigidly connected to the engine adjacent the inlet valve thereof. Supported adjacent the elbow of the conduit and upon substantially the same level, I provide a liquid fuel container 13 having a supply conduit 14 at the lower portion thereof and an overflow conduit 15 leading from adjacent the upper portion. Within the container and adjacent the lower portion, I provide a baffle plate 16 directly over the inlet end of the supply pipe 14, whereby the incoming liquid is prevented from agitating the liquid in the container to any material extent, thus facilitating the maintenance of a substantially constant liquid level even with the overflow pipe 15.

Within the air supply conduit 10 and adjacent the elbow thereof, I provide a small shallow cup 17 having a conduit operatively connecting it to the container 13 and adapted to expose liquid fuel to the action of the air and maintain a liquid level even with the liquid level in the container 13. The cup 17 is provided with a conduit 18 leading from the bottom through the wall of the air supply conduit 10 and entering the wall of the container 13 below the level of the overflow pipe 15. Intermediate the ends of the conduit I provide a valve casing 19 having a suitable valve 20 for controlling the supply of liquid fuel from the container to the cup, and any suitable mechanism may be provided for operating the valve, as, for instance, a threaded valve stem 21 extending through a packing box 22. The container is closed at the upper end by a suitable cap 23, and this cap is preferably provided with a small air hole 24 to maintain the level in the container 13 under atmospheric pressure.

Within the elbow of the air-pipe 10, and extending from the upper portion thereof to a point above the center of the cup 17, I preferably provide a baffle plate 25 serving to deflect the upper current of air against the surface of the liquid in the cup.

In the operation of my improved charge-forming means, the liquid fuel is supplied through the conduit 14 at the desired rate of speed by means of any suitable form of pump, and any excess of liquid overflows through the conduit 15 and returns to the general supply tank. The liquid level within the container 13 is maintained constant, as is also the liquid level in the cup 17 which is in open communication therewith. Air is either sucked through the conduit 10 by the engine piston, or may be forced through by a suitable blower. The air in striking the baffle plate 25 is deflected against the surface of the liquid fuel and causes a rapid vaporization thereof and the formation of the explosive charge, which latter passes outward through the horizontal portion 11 of the conduit 10 and enters the engine.

Having thus described my invention, I claim as new and desire to secure by Letters Patent:

1. A carbureter, comprising a liquid fuel cup, means for maintaining a liquid therein at a substantially constant level, means for delivering air into engagement with the under surface of said cup, and means for deflecting the air into engagement with the surface of the liquid, whereby the liquid is brought to the temperature of the air by conduction and evaporated by direct contact.

2. A carbureter, comprising an air supply conduit having a vertically-extending portion and a horizontally-extending portion meeting in an elbow, a liquid fuel cup within said container and adjacent said elbow, a baffle plate within said conduit and extending from the upper side of the conduit to a point above said cup, whereby the air in passing through the conduit is deflected against the liquid in the cup, and means for maintaining a constant liquid level.

In testimony whereof I have signed my name to this specification in the presence of two subscribing witnesses.

WILLIAM L. WAYRYNEN.

Witnesses:
 E. A. RUDEN,
 MATH. WAYRYNEN.